United States Patent
Tiberghien et al.

(10) Patent No.: US 8,894,431 B2
(45) Date of Patent: Nov. 25, 2014

(54) CONNECTOR ASSEMBLY AND CORRESPONDING ASSEMBLY

(71) Applicant: Staubli Faverges, Faverges (FR)

(72) Inventors: Alain-Christophe Tiberghien, Sevrier (FR); Christophe Durieux, Gilly sur Isere (FR); Igor Bahno, Albertville (FR)

(73) Assignee: Staubli Faverges, Faverges (FR)

( * ) Notice: Subject to any disclaimer, the term of this patent is extended or adjusted under 35 U.S.C. 154(b) by 43 days.

(21) Appl. No.: 13/890,911

(22) Filed: May 9, 2013

(65) Prior Publication Data

US 2013/0309886 A1 Nov. 21, 2013

(30) Foreign Application Priority Data

May 16, 2012 (FR) ..................................... 12 54537

(51) Int. Cl.
| | |
|---|---|
| H01R 13/64 | (2006.01) |
| F16L 37/56 | (2006.01) |
| H01R 13/631 | (2006.01) |
| H01R 12/91 | (2011.01) |

(52) U.S. Cl.
CPC ................ *H01R 12/91* (2013.01); *F16L 37/56* (2013.01); *H01R 13/6315* (2013.01)
USPC .......................................... 439/247; 439/248

(58) Field of Classification Search
CPC ........... H01R 13/6315; H01R 2103/00; H01R 13/629; H01R 2107/00; H01R 13/62905; H01R 13/745
USPC .................................. 439/247, 248, 374, 378
See application file for complete search history.

(56) References Cited

U.S. PATENT DOCUMENTS

| | | | |
|---|---|---|---|
| 6,422,886 B1 | 7/2002 | Macbeth | |
| 7,090,521 B2 * | 8/2006 | Nishio et al. | 439/248 |
| 7,458,837 B2 * | 12/2008 | Mineo | 439/248 |
| 7,507,099 B2 * | 3/2009 | Cowgill et al. | 439/248 |
| 8,585,421 B2 * | 11/2013 | Yamaguchi et al. | 439/248 |
| 8,734,172 B2 * | 5/2014 | Takei et al. | 439/248 |
| 2006/0141836 A1 | 6/2006 | Van Der Mee | |
| 2009/0068870 A1 | 3/2009 | Mezhinsky | |
| 2010/0009825 A1 | 1/2010 | Norton | |

FOREIGN PATENT DOCUMENTS

| | | | |
|---|---|---|---|
| DE | 10 2010 035868 B3 | 2/2012 | |
| JP | 61 267277 A | 11/1986 | |

\* cited by examiner

*Primary Examiner* — Xuong Chung Trans
(74) *Attorney, Agent, or Firm* — Dowell & Dowell, PC (57) ABSTRACT

This connector assembly (4) comprises a connecting plate (12) provided with at least one electrical (16) and/or fluid (14) connection element, which defines a direction of connecting (Z) to a complementary connection element (18, 20), a support (22) and a floating device (26). The plate (12) is able to be displaced in relation to the support (22) in an offset position in a plane (X-Y). The floating device (26) recenters the plate (12) in an idle position in disconnected configuration and comprises a recentering element (28) integral with an element (12, 22) and means of recalling (30) a cam surface (38) of the recentering element (28) in contact with a cam follower surface (40) arranged on an element (12, 22). The surface (38) and/or the surface (40) is inclined (α) in relation to the direction (Z), and the recentering element (28) is mobile according to the direction (Z) in relation to the plate (12) and in relation to the support (22) between the idle and offset positions.

15 Claims, 6 Drawing Sheets

CONNECTOR ASSEMBLY AND CORRESPONDING ASSEMBLY

This invention relates to a connector assembly comprising a connecting plate provided with at least one electrical and/or fluid connection element, with the connection element defining a direction of connecting to a complementary electrical and/or fluid connection element, a support, the connecting plate being able to be displaced in relation to the support in an offset position in a plane perpendicular to the direction of connecting for the connection of the connection elements and a floating device between the connecting plate and the support, with the floating device being able to recentre the connecting plate in a determined idle position of the connecting plate in relation to the support in disconnected configuration of the connecting plate, from said offset position of the plate.

It applies in particular to a connecting plate provided with electrical and/or fluid connection elements. More specifically, it applies for the blind connection of a tank of liquid provided with complementary connection elements.

It is known to render a connecting plate floating in relation to a support in order to adapt it to any misalignments between the plate and its complementary plate and to recentre the connecting plate to the average position in relation to the support after disconnection in order to overcome for example initial defects due to gravity. The floating of the next connection will thus be as tolerant as the preceding one. Such a connecting plate is disclosed for example in JP61267277. The recentring of the plate into average position is provided by tapered surfaces that place a spring in contact. In order to render the connecting plate floating, a cone fixed to the support outside of its housing arranged on the floating plate must be pushed back in relation to the floating plate, by pushing back against the spring. This imposes substantial connection forces, obliges substantial connection travel and renders the floating device cumbersome. In addition, the position of the floating plate according to the direction of connecting depends on the misalignments and it is therefore necessary in order to guarantee the proper connection of the plates to provide a connection overtravel, which penalises the encumbrance of the assembly formed by the plate and the complementary plate.

The purpose of the invention is to overcome at least one of these disadvantages.

To this effect, the purpose of the invention is an assembly such as defined hereinabove, characterised in that the floating device comprises on the one hand a recentring element integral in the plane with the connecting plate and on the other hand means of elastic recalling of a cam surface of the recentring element in contact with a cam follower surface arranged on the support, with the connecting plate and the support being separate, in that the cam surface and/or the cam follower surface is inclined in relation to the direction of connecting, in that the connecting plate is fixed according to the direction of connecting in relation to the support, in that the recentring element is mobile according to the direction of connecting in relation to the connecting plate and in relation to the support between the idle position and said offset position of the plate, in that a stop plate and the connecting plate are arranged on either side of the support according to the direction of connecting, and in that the recentring element is arranged between the stop plate and the support. According to embodiments, the invention comprises one or several of the following characteristics:

the cam surface is a surface of revolution and wherein in particular the cam surface is a tapered or conical external surface;
the recentring element is provided with a central bore and is slidably mobile on a guiding shaft fixed to the first element among the connecting plate and the support;
the angle ($\alpha$) of inclination of the cam surface and/or of the cam follower surface in relation to the direction of connecting (Z) is between 30° and 60°;
the cam follower surface cooperates with the cam surface of the recentring element in idle position and in offset position of the plate;
the cam follower surface and the cam surface are complementary, in particular inclined by the same angle ($\alpha$);
the recentring element comprises an extension, according to the direction of connecting (Z) in relation to the cam surface, forming a surface for guiding the recentring element according to the direction of connecting (Z);
the means of elastic recalling include a spring arranged between the recentring element and an element integral with the recentring element in the plane (X-Y);
the connecting plate is fixed according to the direction of connecting in relation to the support, to the nearest operating clearances;
the connecting plate and the stop plate form an integral floating assembly mounted sandwiched around the support;
the means of elastic recalling are housed at least partially in a recess of the recentring element;
an assembly such as described hereinabove comprising, for each recentring element, a guide column coaxial to the associated recentring element;
the support comprises a surface forming an abutment according to a direction (X, Y) perpendicular to the direction of connecting to the connecting plate in relation to the support in an offset position of the plate;
the assembly comprises a receiving slide fixed to the support extending in the direction of connecting (Z) and adapted to guide the complementary electrical and/or fluid connection element to the connection element in the coupling phase.

A further purpose of the invention is an assembling of an assembly such as described hereinabove and of a complementary assembly, with the complementary assembly comprising at least one fluid and/or electrical connection that is complementary with each electrical or fluid connection element fixed to a tank of liquid.

Figure 1:
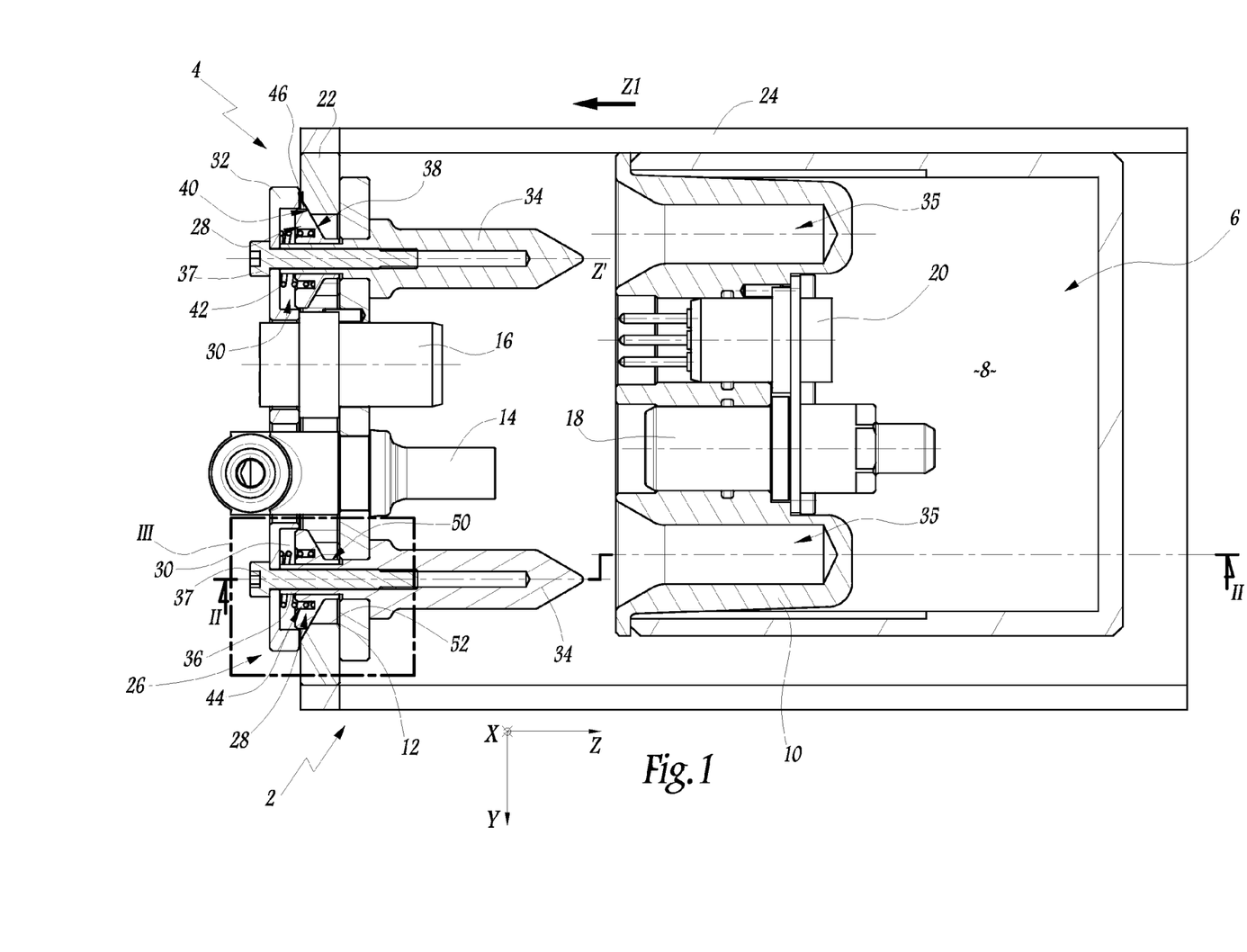
FIG. 1 shows a cross-section view of the assembly according to the invention with a fixed support provided with a connecting plate and with a receiving slide of a tank as well as the tank provided with a complementary plate, in uncoupled position.
Figure 2:
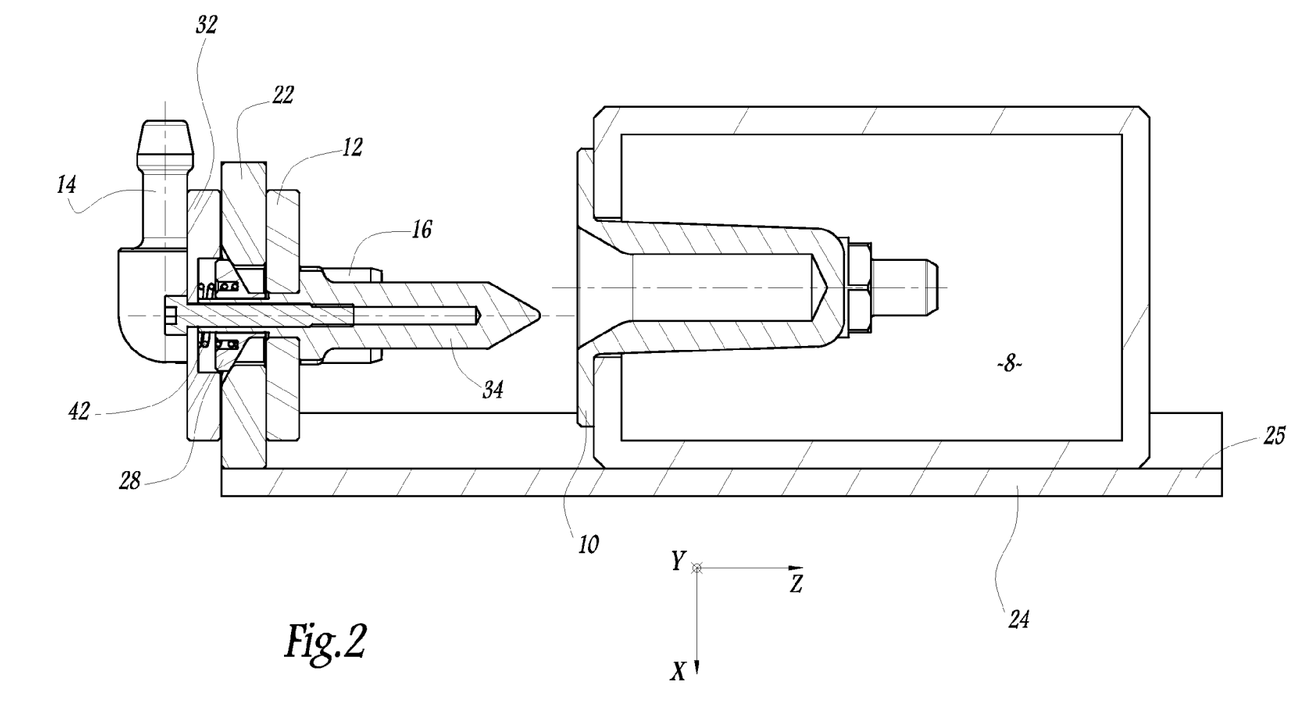
FIG. 2 shows a transverse cross-section view of the assembly, in uncoupled position and according to the broken line II-II of FIG. 1.

The invention shall be better understood when reading the following description, provided solely by way of example and made in reference to the annexed drawings, wherein:

FIG. 1 shows an assembly according to the invention, designated by the general reference 2.

The assembly 2 comprises a connector assembly 4 and a complementary connector assembly 6.

The complementary connector assembly 6 comprises a tank of liquid 8, and a complementary connecting plate 10. The complementary connecting plate 10 is fixed to the tank of liquid 8 (water or other).

The connector assembly 4 comprises a floating connecting plate 12 provided with electrical 16 and/or fluid 14 connection elements adapted to be connected to the complementary connecting plate 10. To this effect, the complementary connecting plate 10 is provided, for each connection element 14, 16, with a complementary connection element, such as a complementary fluid connection element 18 and/or a complementary electrical connection element 20.

The electrical 16/fluid 14 connection elements define a direction of connecting Z parallel to the longitudinal direction of the connection elements 14, 16, and which is the direction of insertion of the elements 14, 16 in the complementary connection elements 18, 20. The assembly 2 defines two directions X and Y which are perpendicular to one another and perpendicular to the direction of connecting Z. The two directions X and Y define a plane of displacement X-Y perpendicular to the direction of connecting Z. The assembly further defines a direction of insertion Z1, which is the direction of insertion of the complementary connector assembly 6 into the connector assembly 4 (cf. FIG. 1).

The connector assembly 4 is provided with a fixed support 22 and with a receiving slide 24 extending in the direction of connecting Z.

The connecting plate 12 is floating in the plane of displacement X-Y in relation to the support 22, i.e. integral, with possibility of displacement in the plane of displacement X-Y, of the fixed support 22, which is itself integral with receiving slide 24 of the tank 8 of liquid. The plate 12 is fixed according to the direction of connecting Z in relation to the fixed support 22, possibly with the nearest operating clearances. The connecting plate 12 is therefore mobile in relation to the support 22 solely in the plane of displacement X-Y. The receiving slide 24 and the fixed support 22 equip for example a liquid distribution station in an agri-food production chain.

The connecting of the connecting plate 12 and of the complementary connecting plate 10 allows for the connection of an electrical connector, constituted of connection elements 16, 20, for the transmission of information such as the level of the tank 8, the temperature of the liquid of the tank 8, the viscosity of the liquid, the type of liquid, the transmission of power for a motor for stirring the liquid and at least one fluid connector, constituted of the connection elements 14, 18, for the passage of the liquid from or to the tank 8.

The connector assembly 4 further comprises a floating device 26 between the plate 12 and the support 22 allowing for the displacement according to the plane of displacement X-Y of the connecting plate 12 in relation to the support 22.

The floating device 26 comprises at least one recentring element 28, in this case two recentring elements 28, and means of elastic recalling 30.

The connector assembly 4 defines an average position of the connection elements 14, 16 in relation to the fixed support 22 in disconnected configuration of the plate 12. This average position is shown in FIG. 1 and corresponds to a theoretical average position of the amplitude of the travel allowed by the floating device 26 according to the direction X and according to the direction Y.

The floating device 26 defines a single and determined idle position of the connecting plate 12 in relation to the support 22. This idle position corresponds to the average position of the connection elements 14, 16 in relation to the support 22. The floating device 26 recentres the plate 12 in idle position, and therefore returns the connection elements 14, 16 to their average position in disconnected configuration of the plate 12.

In disconnected idle position of the plate 12, all of the connection elements 14, 16 carried by the connecting plate 12 pass through the fixed support 22 with a clearance according to the directions X and Y. This clearance allows for the displacement according to the plane of displacement X-Y of the connection elements 14, 16 during the operation of connecting of the plates 10, 12.

The connector assembly 4 and the complementary connector assembly 6 define at least one relative offset position when the connection elements 18, 20 of the complementary connector assembly 6 are offset in the plane of displacement X-Y in relation to the connection elements 14, 16 of the connector assembly 4 in disconnected configuration, at the beginning of the coupling. The extreme relative offset position or positions are delimited by the slide 24 which guides the complementary connector assembly 6 in relation to the fixed support 22 for its connection to the connector assembly 4.

The connector assembly 4 and the complementary connector assembly 6 are configured in such a way that, when the complementary connector assembly 6 is brought closer to the connector assembly 4 according to the direction of connection Z1 with the purpose of coupling the two assemblies, a misalignment between the complementary connection elements 18, 20 of the complementary connector assembly 6 and the connection elements 14, 16 of the connector assembly 4 is corrected and the connector assembly 4 is aligned with the complementary connector assembly 6 in such a way that the connection elements 14, 16 are connected to the connection elements 18, 20 thanks to the floating device 26.

The connector assembly 4 comprises two guide columns 34 which extend according to the direction Z and which are fixed on the connecting plate 12. Each guide column 34 comprises a chamfered free end turned towards the complementary connecting plate 10 at the beginning of the connection. Each guide column 34 is coaxial to the associated recentring element 28, i.e. the recentring element 28 slides along an axis coaxial with the longitudinal axis of each associated guide column 34. For each recentring element 28, the connector assembly 4 is provided with a guiding shaft 36, integral with the plate 12, along which is slidably mounted the recentring element 28. Here, each guiding shaft 36 extends one guide column 34.

Each guiding shaft 36 is a guiding element according to the direction Z of the recentring element 28 and attaches the recentring element 28 with the plate 12 in the plane X-Y.

The floating device 26 comprises a stop plate 32.

The connecting plate 12 and the stop plate 32 form a floating integral assembly mounted sandwiched around the support 22. The connecting plate 12 and the stop plate 32 are maintained on either side of the support 22. The connecting plate 12 and the stop plate 32 are maintained on either side of the support 22 by a screw 37 passing through the guiding shaft 36 and engaged with the guide column 34. The plate 12 is arranged on the side of the complementary plate 10 in relation to the support 22 in coupling phase of the plates 10 and 12. The floating device 26, and in particular the stop plate 32, is arranged on the side opposite the complementary connection elements 18 and 20 in relation to the plate 12. As such, the plate 12 is entirely opposite the complementary plate 10.

For each guide column 34, the complementary connecting plate 10 is provided with a column housing 35 that is complementary with the associated guide column 34. Each column housing 35 comprises an entry chamfer turned towards the connecting plate 12 during the connection.

The recentring element 28 has an external cam surface 38 that cooperates with a cam follower surface 40 that is complementary with the fixed support 22. The cam surface 38 is a convex surface. The cam follower surface 40 is a concave surface. Here, the recentring element 28 is a revolution part in the shape of a washer of which an external surface constituting the cam surface 38 is tapered or conical and which is pierced with a longitudinal central bore 39 (cf. FIG. 3) complementary, with the nearest radial operating clearances, to the outside diameter of the guiding shaft 36 around which the bore 39 is slidingly mounted. The cam follower surface 40 is a tapered or conical surface.

The two surfaces 38, 40 are complementary. They have the same angle α of inclination in relation to the direction Z which is between 30° and 60°, here 60° in FIGS. 1 to 4. This configuration guarantees a high extent of contact between the surfaces 38 and 40 in idle position of the plate 12.

The recentring element 28 is arranged between the stop plate 32 and the support 22 according to the direction Z. The recentring element 28 is pushed back by the means of elastic recalling 30 in the direction of the cam follower surface 40 of the fixed support 22. The means of elastic recalling 30 include, for each recentring element 28, a spring 42. The spring is arranged between the stop plate 32 and the recentring element 28. This configuration guarantees that the connecting plate 12 is maintained in abutment against the support 12 according to the direction of connection Z1 for better positioning precision of the connection elements at the end of coupling. The spring 42 is partially housed in a blind recess 44 of the recentring element 28. The length of the recess 44 is at least equal to the length of the spring 42 entirely compressed.

Figure 3:
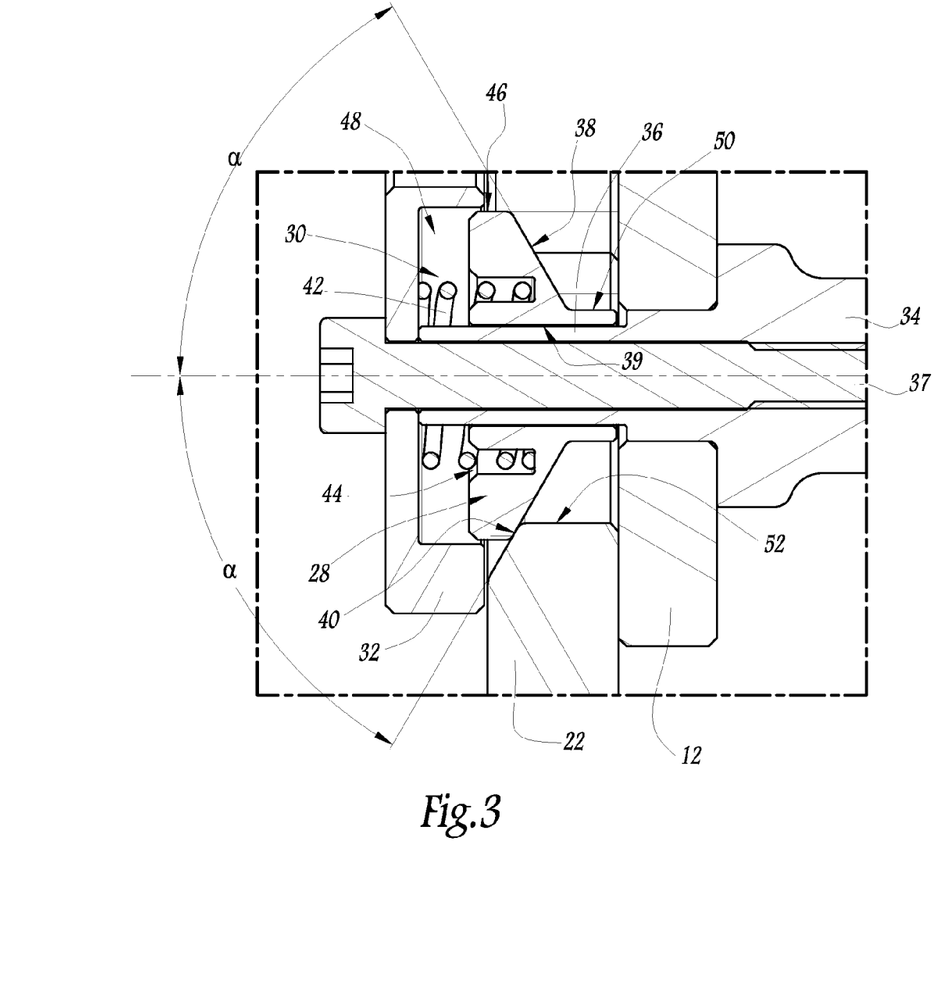
FIG. 3 shows the detail III of the FIG. 1 on a larger scale.

As can be seen in FIG. 3, the recentring element 28 extends according to the direction Z on one side by a first annular cylindrical extension 46 participating in the axial guiding of the recentring element 28 in the stop plate 32 and forming a guiding surface of this element 28. To this effect, the stop plate 32 comprises a housing of extension 48 that is substantially complementary with the extension 46.

The recentring element 28 comprises a second cylindrical extension 50 in the direction Z in relation to the cam surface 38 and the cam follower surface 40 of the support 22 extends in a partially cylindrical recess 52 of which the axis is confounded with the axis of revolution of the tapered cam surface 38 of the recentring element 28 in idle position of the plate 12. The cylindrical extension 50 is housed with clearance in the recess 52 in disconnected configuration of the plate 12 and its external surface comes to abut against the recess 52 in maximum offset position of the connecting plate 12 in the plane X-Y in relation to the support 22. The plate 12 is then abutting against the support 22 according to the directions X and Y.

In addition, the second annular cylindrical extension 50 forms a guiding surface with a substantial length of the recentring element 28 along the guiding shaft 36.

The recentring element 28, the spring 42 and the guiding elements according to the direction Z of the recentring element 28 are part of the floating device 26 which allows for the displacement and the recalling of the connecting plate 12 to the average position of the connection elements 14, 16 in relation to the support 22.

The assembly operates in the following way, during the coupling. The filled tank 8 of liquid is engaged in the receiving slide 24 and the complementary connecting plate 10 brought according to the direction Z1 into contact with the guide columns 34 of the connecting plate 12. The receiving surface 25 of the receiving slide 24 guarantees that there is no angular misalignment, only a misalignment according to X and/or Y between the longitudinal axes of the connection elements 14, 16, of the guide columns 34 carried by the plate 12 and the longitudinal axes of the complementary connection elements 18, 20, of the column housings 35 carried by the plate 10. The coaxial misalignment places into contact the guide columns 34 with the entry chamfers of their column housings 35, and the connection force according to the direction Z1 creates a component of force on the guide columns 34 in the plane X-Y. This component of force is transmitted on contact between the cam surface 38 of the recentring element 28 and the associated cam follower surface 40 of the fixed support 22. This effort pushes back the recentring element 28 against the force of the spring 42 by separating the recentring element 28 of the connecting plate 12.

The recentring element 28 is then displaced according to the direction of connection Z1 in relation to the connecting plate 12 and in relation to the fixed support 22, the cam surface 38 remaining in contact with the cam follower surface 40, which allows the connecting plate 12 to be displaced in the plane X-Y in relation to the fixed support 22. The relative movement of the connecting plate 12 in relation to the fixed support 22 according to the directions X and/or Y is possible until the recentring element 28 arrives in contact with the recess 52 of the fixed support 22 and that simultaneously the recentring element 28 reaches longitudinal contact against the stop plate 32. If the misalignment has a component according to X and a component according to Y, the recentring element 28 becomes misaligned in relation to the longitudinal axis Z' of the recess 52 in the fixed support 22 with a contact between the recentring element 28 and the fixed support 22 which takes place outside of the cross-sections of FIGS. 1 and 2. When each guide column 34 is engaged in its column housing 35 in the complementary plate 10, but the connection elements 14, 18 and 16, 20 are not yet coupled, the two plates 10 and 12 are aligned and the approaching of the complementary connecting plate 10 to the connecting plate 12 according to the direction of connection Z1 continues with the nesting of the connection elements 14, 18 and 16, 20 aligned until the abutment of the complementary connecting plate 10 against the plate 12. The connection elements 14 and 16 are then coupled to the complementary elements 18 and 20. The plate 12 is then connected to the plate 10, in an offset position in the plane X-Y in relation to the support 22 in relation to its idle position. This configuration is shown in FIG. 4.

Figure 4:
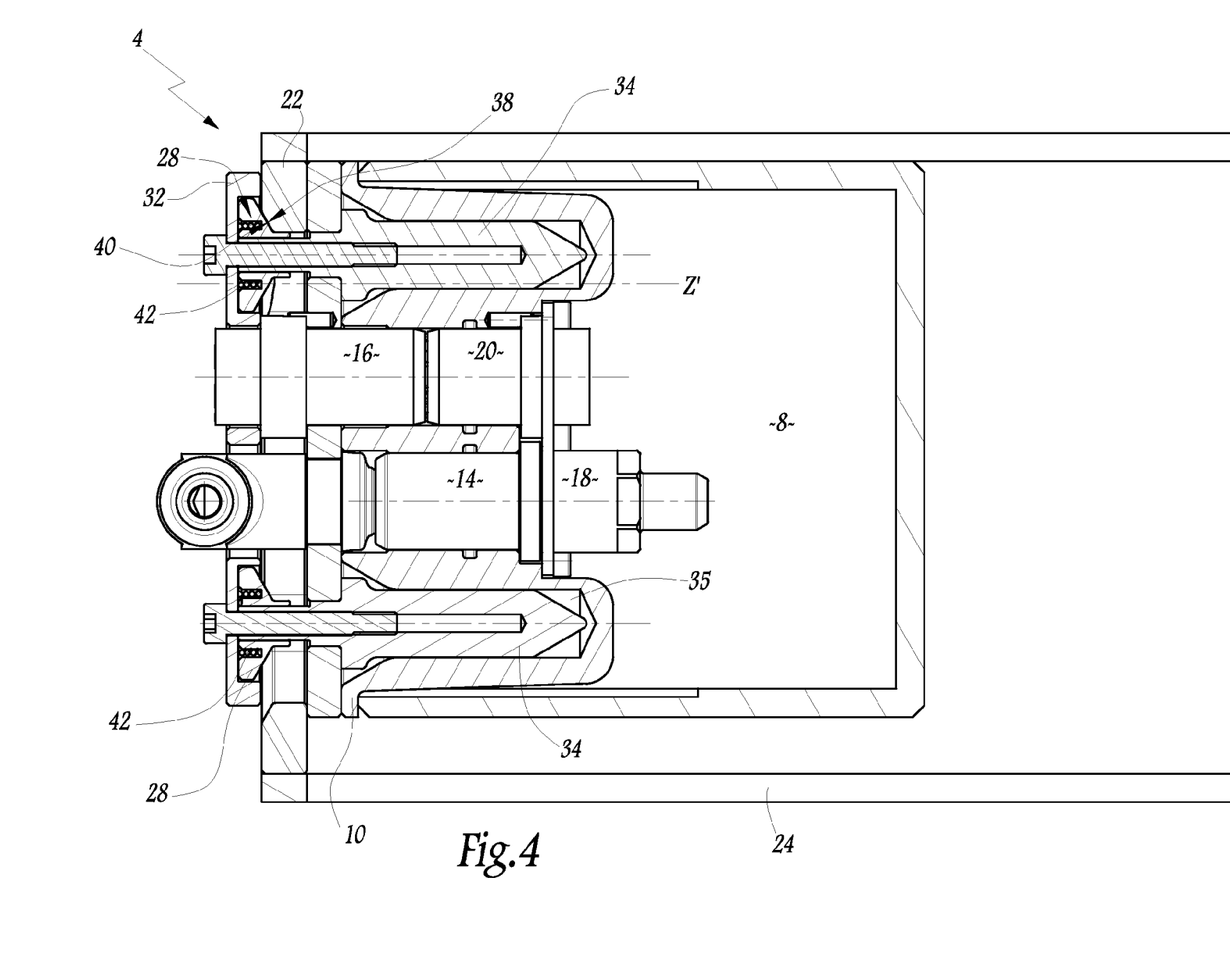
FIG. 4 shows the assembly of the invention according to a cross-section on fixed support and on the connecting plate floating similar to that of FIG. 1, but with the connecting plate floating being coupled with the complementary connecting plate.

FIG. 4 shows the recentring element 28 abutting against the recess 52 of the fixed support 22 in this cross-section, with this position able to be reached only when the misalignment is exclusively according to a direction Y parallel to the receiving surface 25. The coupled position of the connection plates 12 and of the complementary plate 10 is maintained by the locking of the tank 8 according to the direction Z.

The elastic means 30 maintain the cam surface 38 in contact with the cam follower surface 40 in idle position, in offset position of the plate and during the entire coupling phase.

Between the idle position of the connecting plate 12 and the offset position of the connecting plate 12 in relation to the support 22, the recentring element 28 has been displaced relatively to the connecting plate 12 and to the fixed support 22 according to the direction Z. The recentring element 28 has been displaced in the directions X and/or Y in relation to the support 22, remaining integral in the plane X-Y of the plate 12.

Figure 5:
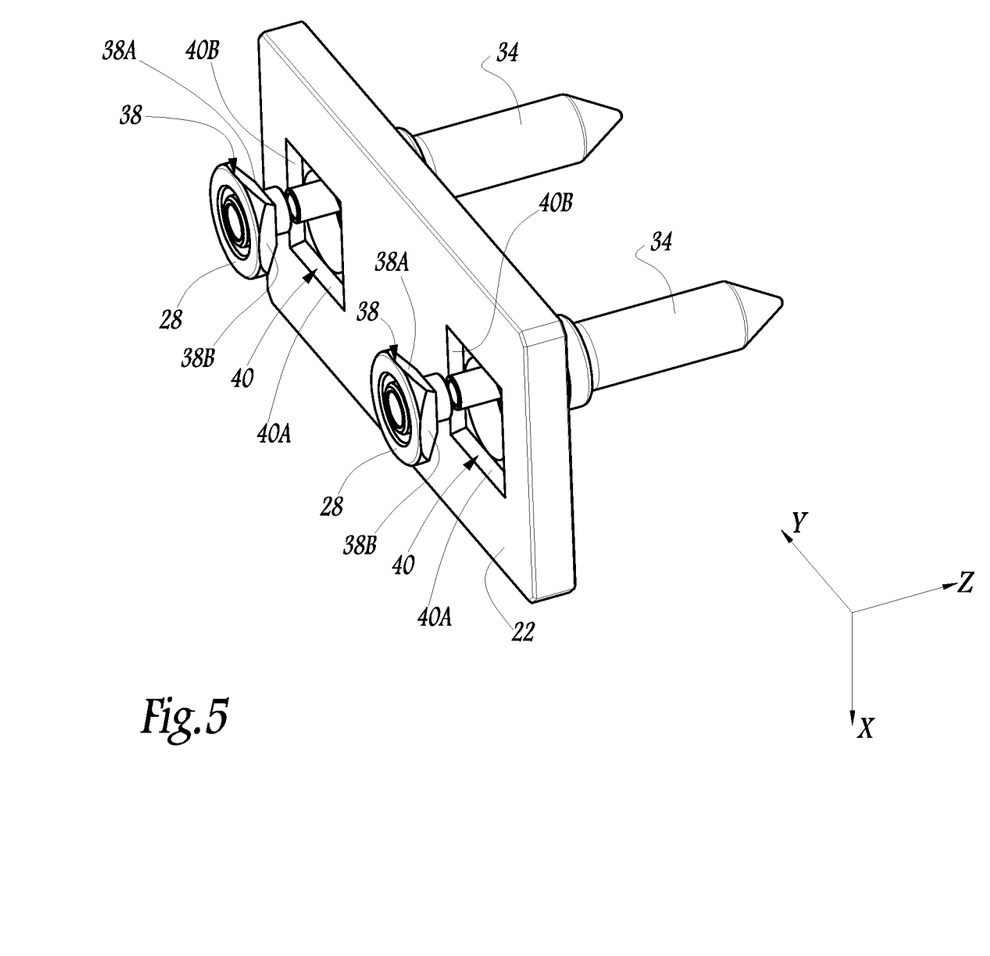
FIG. 5 shows an exploded isometric view of two recentring elements with four inclined slopes cooperating respectively with four inclined surfaces arranged on the fixed support.

An angle α of 60° for the cam surface 38 makes it possible to obtain an alignment of the connecting plate 12 with the plate 10 with a moderate connection force and a limited displacement of the recentring element 28 according to Z then a recentring of the plate 12 in idle position under an acceptable elastic effort. This angle α is measured in relation to the direction Z and indicated in FIG. 3. At the uncoupling, the tank 8 provided with the complementary plate 10 is separated from the fixed support 22 according to a direction of uncoupling, which goes against the direction of connection Z1, the connection elements 14, 18 and 16, 20 are disconnected, then as they disengaging of each guide column 34 outside of its column housing 35 takes place, the recentring element 28, elastically pushed back in contact with the fixed support 22, is brought back towards the longitudinal axis of its housing and provides the return of the connecting plate 12 in its idle position in relation to the fixed support 22. Then, the tank 8 is removed from the receiving slide 24. In FIG. 5 is shown a portion of an alternative of a connector assembly according to the invention. This alternative is distinguished from the previously described embodiment solely by what follows. The similar elements carry the same references.

Each recentring element 28 comprises, instead of the tapered cam surface, a surface 38 of a frustum of a 4-sided pyramid, therefore with 4 planar surfaces inclined in relation to the direction of connecting Z. Two of the planar surfaces 38A are provided for the floating according to the direction X and two planar surfaces 38B are provided for the floating according to the direction Y. This alternative makes it possible to have high contact surfaces between the recentring element 28 and the fixed support 22.

Likewise, instead of the cam follower tapered surface, the cam follower surface is a frustum surface of a four-sided pyramid, 40A and 40B.

Figure 6:
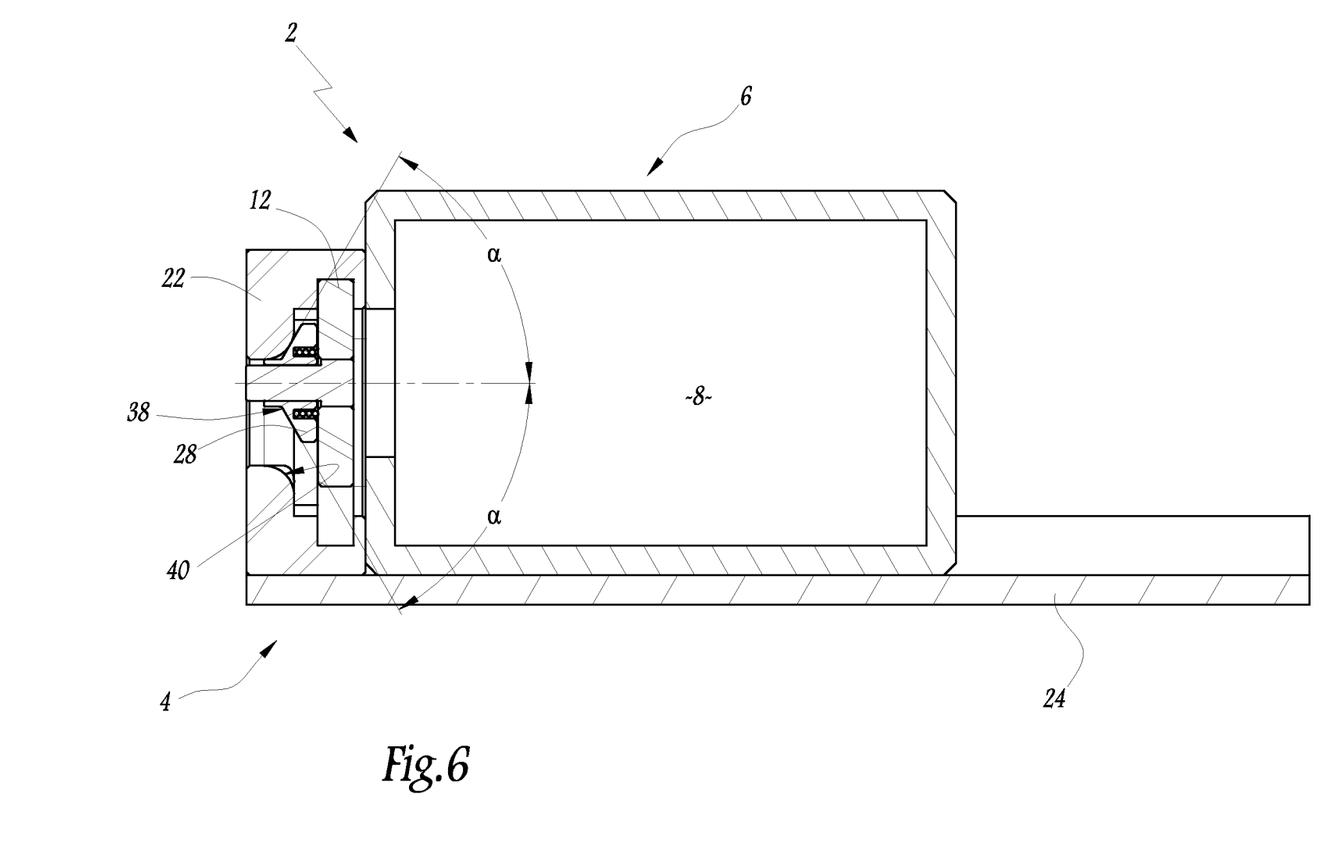
FIG. 6 shows as a cross-section an alternative of the assembly according to the invention without a stop plate, with the fixed support having a toric surface cooperating with the recentring element, in coupled position, with the connections not shown.

The alternative of FIG. 6 comprises the following modifications, which can however be combined individually with the other devices described. Firstly, the recentring element 28 has a cam surface 38 which cooperates with a cam follower surface 40 of the fixed support 22 that is not complementary. For example, the cam surface 38 is tapered and the cam follower surface 40 is a partial toroid surface. In an alternative not shown, the cam surface 38 is a toric surface of revolution and the cam follower surface 40 is a surface of revolution in a cone portion.

Secondly, the fixed support 22 provides alone the guiding in the plane X-Y of the connecting plate 12 and opposes a displacement of the connecting plate 12 in the direction of connection Z1 and in the direction going against this direction Z1. The assembly 4 therefore does not comprise a mobile stop plate 32. To this effect, the connecting plate 12 is lodged mobile in a complementary groove arranged in the support 22. The spring pushes back the recentring element 28 according to the direction Z1 against the support 22.

Finally, the recentring column 34 (not shown in FIG. 6) is not coaxial to the axis of sliding of the recentring element 28 in relation to the plate 12. The plate 10 carrying the connections 18, 20 and the housings 35 is not shown but is fixed on the tank 8.

The assemblies and units described previously can be modified by one or several of the modifications hereinafter.

In an alternative not shown, the recentring of the plate 12 can be obtained with an integral recentring element 28 according to the directions X and Y of the support 22 and of which the cam surface 38 is maintained elastically in contact with a cam follower surface arranged on the plate 12. At least one among the cam surface and the cam follower surface is an inclined surface according to an angle α of 30° à 60°. The configuration for which the cam follower surface 40 is arranged in the support 22 makes it possible to not weaken the plate 12, already provided with columns and connection elements, and to reduce its encumbrance.

As an alternative, only one among the cam surface 38 and the cam follower surface 40 is inclined. The other among the cam follower surface and the cam surface can be reduced to an edge. In an alternative not shown, the inclined surface can be partially spherical. The angle of inclination of the surface inclined in relation to the direction of connecting Z is then defined by the tangent to the inclined surface on contact between the cam surface 38 and the cam follower surface 40.

As a further alternative, each guide column 34 is arranged on the complementary plate 10, while the connecting plate 12 is provided with each column housing 35 adapted to receive the guide column 34.

As a further alternative, the support 22 of the connecting plate 12 is not fixed but can be displaced in order to connect the connecting plate 12 with a complementary plate 10 then fixed. A receiving slide of the support 22 is then provided integral with the plate 10.

Alternatively, the guiding shaft 36 is omitted and the longitudinal guiding according to the direction of connecting Z of the recentring element 28 is provided only by a housing of the recentring element arranged in the connecting plate 12 and/or by the stop plate 32 wherein is housed the recentring element 28.

Alternatively, the cam follower surface 40 arranged in the fixed support 22 surrounds over 360° the recentring element 28 in idle position of the plate.

The connector assembly and the assembly are able to be used for all of the applications for recentring a connecting plate 12 in a plane X-Y. As many floating devices can be provided as required by the charge of the floating assembly to be recentred.

The assembly according to the invention has the following advantages.

The recentring by recentring elements 28 makes it possible to overcome the initial defects and therefore to suppress or to limit the entry chamfer of the column housings 35 and contributes to a complementary plate with reduced encumbrance.

The encumbrance of the floating device is low according to the direction of connection Z in comparison with floating connection devices of prior art.

The floating device is within the axial encumbrance of the connector assembly 4.

The spring 42 is mounted partially inside the recentring element, which limits the encumbrance according to the direction Z.

An angle α of 60° limits the axial movement of the recentring element during the alignment of the plates which contributes to the compactness according to Z. Alternatively, the angle α can be between 30° and 60°.

The encumbrance of the assembly is reduced according to the direction of connection Z in comparison with floating connection devices of prior art. Indeed, the movement of the floating plate solely in the plane X-Y associated with a construction which guarantees the direct contact between the floating plate and the support in the direction Z makes it possible to overcome a connection overtravel of the complementary plate.

The encumbrance of the assembly is reduced according to the plane X-Y. In particular, the floating plate is arranged outside the support which limits the encumbrance of the floating plate required to implant the connection and guiding elements on the floating plate. The floating device is of simple construction due to simple machining.

The floating device is reliable given that its mobile portions, such as the recentring element, are protected from the exterior by the plates 12 and 32 mounted sandwiched around the support 22.

The invention claimed is:

1. Connector assembly (4) comprising:
    a connecting plate (12) provided with at least one electrical (16) and/or fluid (14) connection element, with the connection element defining a direction of connecting (Z) to a complementary electrical (18) and/or fluid (20) connection element,
    a support (22), the connecting plate (12) able to be displaced in relation to the support (22) in an offset position in a plane (X-Y) perpendicular to the direction of connecting for the connection of the connection elements (14, 16, 18, 20) and
    a floating device (26) between the connecting plate and the support,
with the floating device (26) able to recentre the connecting plate (12) in a determined idle position of the connecting plate in relation to the support in disconnected configuration of the connecting plate, from said offset position of the plate (12), characterised in that the floating device comprises
on the one hand a recentring element (28) integral in the plane (X-Y) with the connecting plate (12) and
on the other hand means of elastic recalling (30) of a cam surface (38) of the recentring element (28) in contact with a cam follower surface (40) arranged on the support (22), the connecting plate (12) and the support (22) being separate, in that the cam surface (38) and/or the cam follower surface (40) is inclined ($\alpha$) in relation to the direction of connecting (Z), in that the connecting plate (12) is fixed according to the direction of connecting (Z) in relation to the support (22), in that the recentring element (28) is mobile according to the direction of connecting (Z) in relation to the connecting plate (12) and in relation to the support (22) between the idle position and said offset position of the plate (12), in that a stop plate (32) and the connecting plate (12) are arranged on either side of the support (22) according to the direction of connecting (Z), and in that the recentring element (28) is arranged between the stop plate (32) and the support (22).

2. The assembly according to claim 1, wherein the cam surface (38) is a surface of revolution and wherein in particular the cam surface (38) is a tapered or conical external surface.

3. The assembly as claimed in claim 1, wherein the recentring element (28) is provided with a central bore (39) and is slidably mobile on a guiding shaft (36) fixed to the connecting plate (12).

4. The assembly as claimed in claim 1, wherein the angle ($\alpha$) of inclination of the cam surface (38) and/or of the cam follower surface (40) in relation to the direction of connecting (Z) is between 30° and 60°.

5. The assembly as claimed in claim 1, wherein the cam follower surface (40) cooperates with the cam surface (38) of the recentring element (28) in idle position and in offset position of the plate (12).

6. The assembly as claimed in claim 1, wherein the cam follower surface (40) and the cam surface (38) are complementary, in particular inclined by the same angle ($\alpha$).

7. The assembly as claimed in any 1, wherein the recentring element (28) comprises an extension (48, 50), according to the direction of connecting (Z) in relation to the cam surface (38), forming a guiding surface of the recentring element (28) according to the direction of connecting (Z).

8. The assembly as claimed in any 1, wherein the means of elastic recalling include a spring (42) arranged between the recentring element (28) and an integral element (32) of the recentring element (28) in the plane (X-Y).

9. The assembly as claimed in claim 1, wherein the connecting plate (12) is fixed according to the direction of connecting (Z) in relation to the support (22), to the nearest operating clearances.

10. The assembly as claimed in claim 1, wherein the connecting plate (12) and the stop plate (32) form a floating integral assembly mounted sandwiched around the support (22).

11. The assembly as claimed in any preceding claim 1, wherein the means of elastic recalling (30) are housed at least partially in a recess (44) of the recentring element (28).

12. The assembly as claimed in claim 1 comprising, for each recentring element (28), a guide column (34) coaxial to the associated recentring element (28).

13. The assembly as claimed in claim 1, wherein the support (22) comprises a surface forming an abutment according to a direction (X, Y) perpendicular to the direction of connecting (Z) to the connecting plate (12) in relation to the support (22) in an offset position of the plate (12).

14. The assembly as claimed in claim 1, comprising a receiving slide (24) fixed to the support (22) extending in the direction of connecting (Z) and adapted to guide the complementary electrical (20) and/or fluid (18) connection element to the connection element in the coupling phase.

15. Assembling (2) of an assembly as claimed in claim 1 and a complementary ensemble (6), with the complementary ensemble comprising at least one fluid and/or electrical connection complementary with each electrical (16) or fluid (14) connection element fixed to a tank (8) of liquid.

* * * * *